(12) United States Patent
Hilt

(10) Patent No.: US 7,651,104 B1
(45) Date of Patent: Jan. 26, 2010

(54) SYSTEM AND METHOD FOR MOVING OBJECTS

(76) Inventor: Verne Hilt, 1191 Gulf Breeze Pkwy., Gulf Breeze, FL (US) 32561

( * ) Notice: Subject to any disclaimer, the term of this patent is extended or adjusted under 35 U.S.C. 154(b) by 42 days.

(21) Appl. No.: 11/762,958

(22) Filed: Jun. 14, 2007

(51) Int. Cl.
*B62B 3/10* (2006.01)

(52) U.S. Cl. .............................. 280/47.131; 280/47.17; 280/47.34; 280/35; 280/43.1

(58) Field of Classification Search ............ 280/47.131, 280/47.26, 47.2, 47.17, 47.24, 47.34, 62
See application file for complete search history.

(56) References Cited

U.S. PATENT DOCUMENTS

| | | | | |
|---|---|---|---|---|
| 4,629,203 A | * | 12/1986 | Ballard | 280/47.26 |
| 6,050,576 A | * | 4/2000 | Tanner et al. | 280/47.21 |
| 6,062,328 A | * | 5/2000 | Campbell et al. | 180/65.6 |
| 6,135,466 A | * | 10/2000 | Irwin | 280/47.28 |
| 6,273,438 B1 | * | 8/2001 | Prapavat | 280/47.21 |
| 2002/0180184 A1 | * | 12/2002 | Chang | 280/652 |
| 2004/0188964 A1 | * | 9/2004 | Choi | 280/47.27 |
| 2004/0206517 A1 | * | 10/2004 | Gibbs | 172/42 |

FOREIGN PATENT DOCUMENTS

WO   WO 2006/067228    *  6/2006
WO   WO 2006067228 A1 *  6/2006

* cited by examiner

*Primary Examiner*—Paul N Dickson
*Assistant Examiner*—Bryan A Evans
(74) *Attorney, Agent, or Firm*—Andrew Vicknair (57) ABSTRACT

A method and system are disclosed for moving objects, such as large potted plants, large oval shaped objects and objects of various other shapes. A user can utilize the present invention to move large potted plants and other objects without exerting a large amount of physical force thereby reducing the chance of a user suffering an injury resulting from moving large objects. A user can slide a large potted plant onto the present invention and then proceed in moving the large potted plant without exerting a large amount of force.

17 Claims, 4 Drawing Sheets

SYSTEM AND METHOD FOR MOVING OBJECTS

TECHNICAL FIELD

The present invention relates, in general to a material movement system and method, and more specifically to a system and method for moving objects, such as large potted plants and other similarly shaped objects.

BACKGROUND OF INVENTION

Moving objects from one location to another location can be simplified with the use of some type of device, such as a hand cart, a hand truck, a dolly and the like. Such devices are often used everyday in a variety of locations for a variety of purposes, such as use at, in, or near factories, warehouses, offices, outdoor environments, homes and the like. These hand trucks and carts come in different sizes and shapes, depending on the nature of the object to be moved. For example, when large objects are moved, such as refrigerators, stoves, and the like, individuals may move a large object and position the large object on the dolly or cart so that the individual can move the large object to the desired destination with the use of the dolly or cart.

Various types of dollys may be used to move objects depending on the object to be moved. For example, a special hand dolly may be used to assist in moving large objects, such as refrigerators, and the like. In such a case, the hand dolly may include some type of member to prevent the object from being dislocated from the dolly.

While hand carts, dollys, or trucks are often used to assist individuals in relocating objects, such carts are unable to help individuals move specifically shaped objects, such as large plants, large vases, and other similarly shaped objects. For example, movement of such objects may be very difficult due to various restrictions imposed by current structures. Often, because currently existing dollies do not accommodate large and various shaped objects, such as those listed above, individuals often end up moving the objects without the use of any hand held carts and/or dollies. The result of having to move said objects without the assistance of a dolly and/or hand cart often results in injury to the individual and/or damage to the object from the process of being dragged, dropped, and the like.

Accordingly, a need exists in the art for a system and method that allows individuals to move large objects and objects of various shapes so that these objects can be moved as needed without having to worry about damaging the object and/or becoming injured during the moving process.

BRIEF SUMMARY OF THE INVENTION

The present invention is directed to a system and method for moving objects. In one embodiment, the present invention provides a tilting dolly capable of carrying large shaped objects and objects of various shapes so that it enables an individual to move objects, such as large circular shaped objects. One objective of one embodiment of the present invention is to allow for the transportation and/or movement of potted plants from one location to another location with limited and/or minimal effort required from a user of the present invention. The present invention may be configured so that a user may not have to lift an object to be moved with the present invention. Thus, an object to be moved with the present invention can be moved by a user wherein the user is not required to completely lift the object in order for the object to be moved. In one embodiment, the tilting dolly may include a lip base that is configured so that it can be slid underneath an object thereby simplifying the process of having to lift objects prior to moving the object with the present invention. In addition, the present invention may be configured with multiple wheels to enable and provide for ease of movement of an object that is to be moved with the present invention.

In one embodiment of the present invention, the tilting dolly is configured so that the weight of the tilting dolly enables the tilting dolly to either sit in a back position or sit in a forward position. The tilting dolly may also include a portion/section that is configured so that the application of a downward force to this portion/section will enable the tilting dolly to sit back whereby the weight of an object on the tilting dolly will enable the tilting dolly and object to stay in the "sit back" position so that the tilting dolly and object can be easily moved via a plurality of wheels.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying figures, in which.

DETAILED DESCRIPTION OF THE INVENTION

Figure 1:
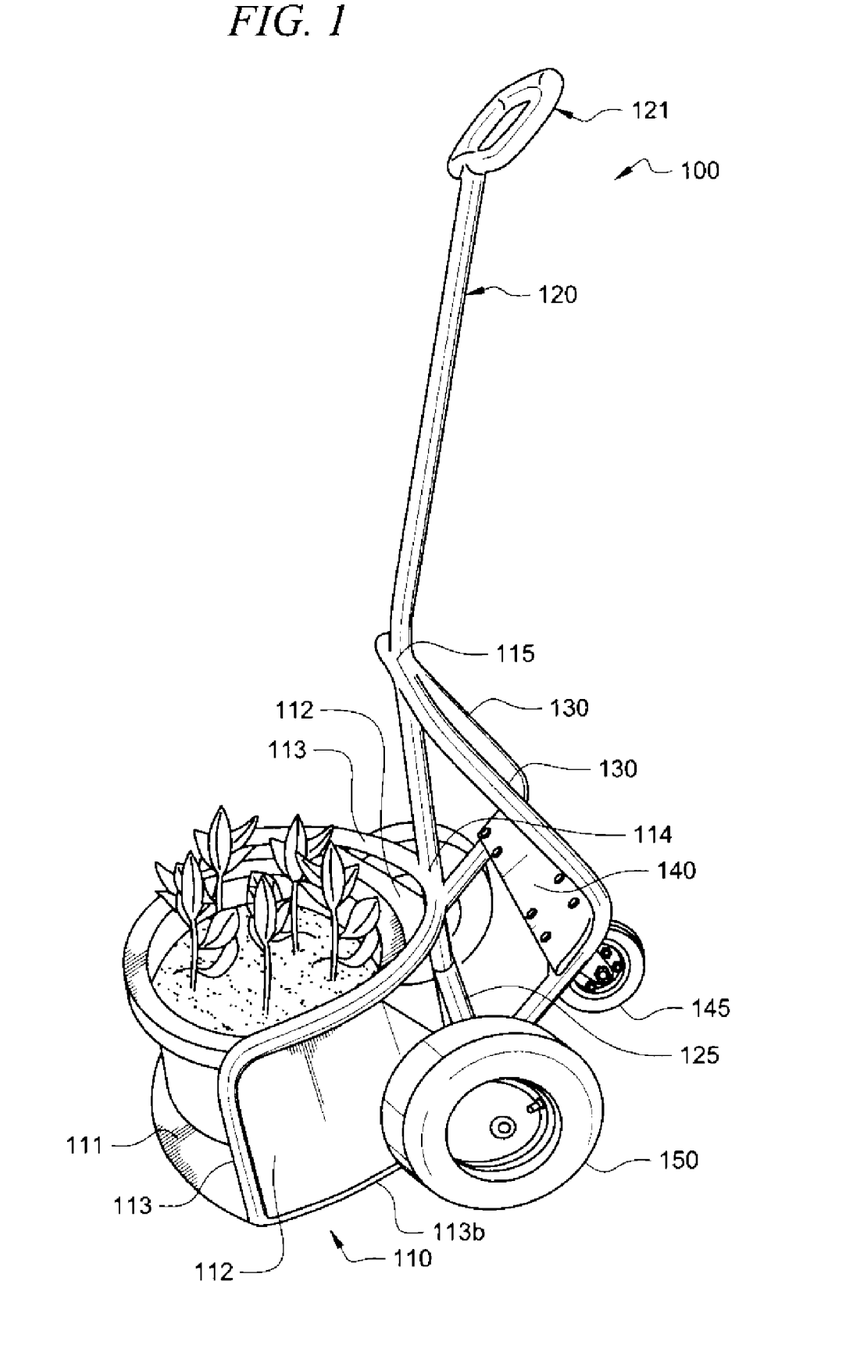
FIG. 1 illustrates a side overview of an embodiment of the present invention.
Figure 2:
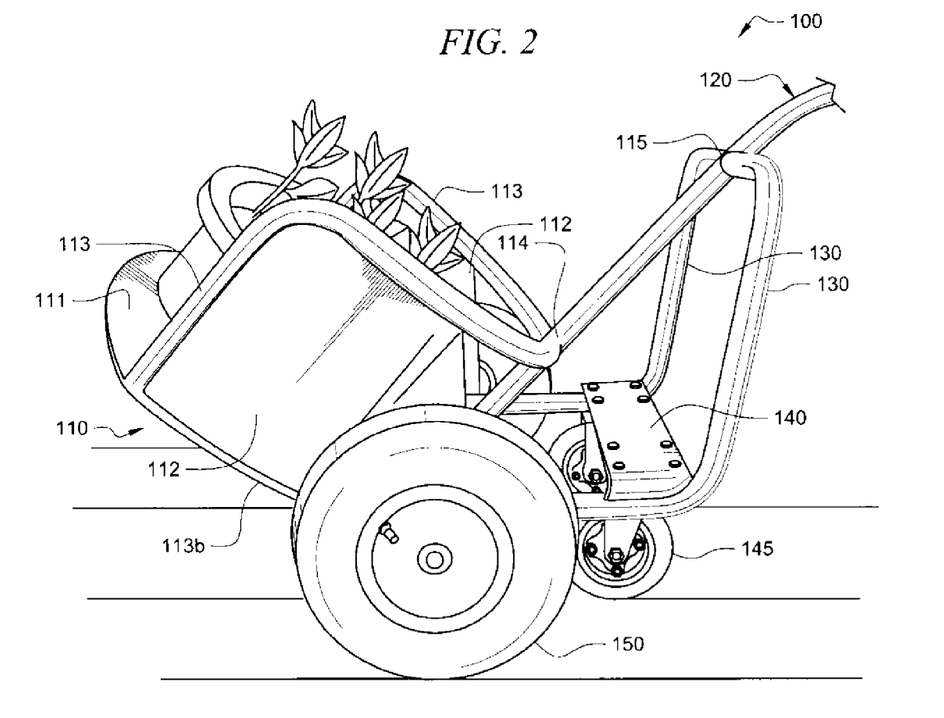
FIG. 2 illustrates a close up view of a portion of an embodiment of the present invention.
Figure 3:
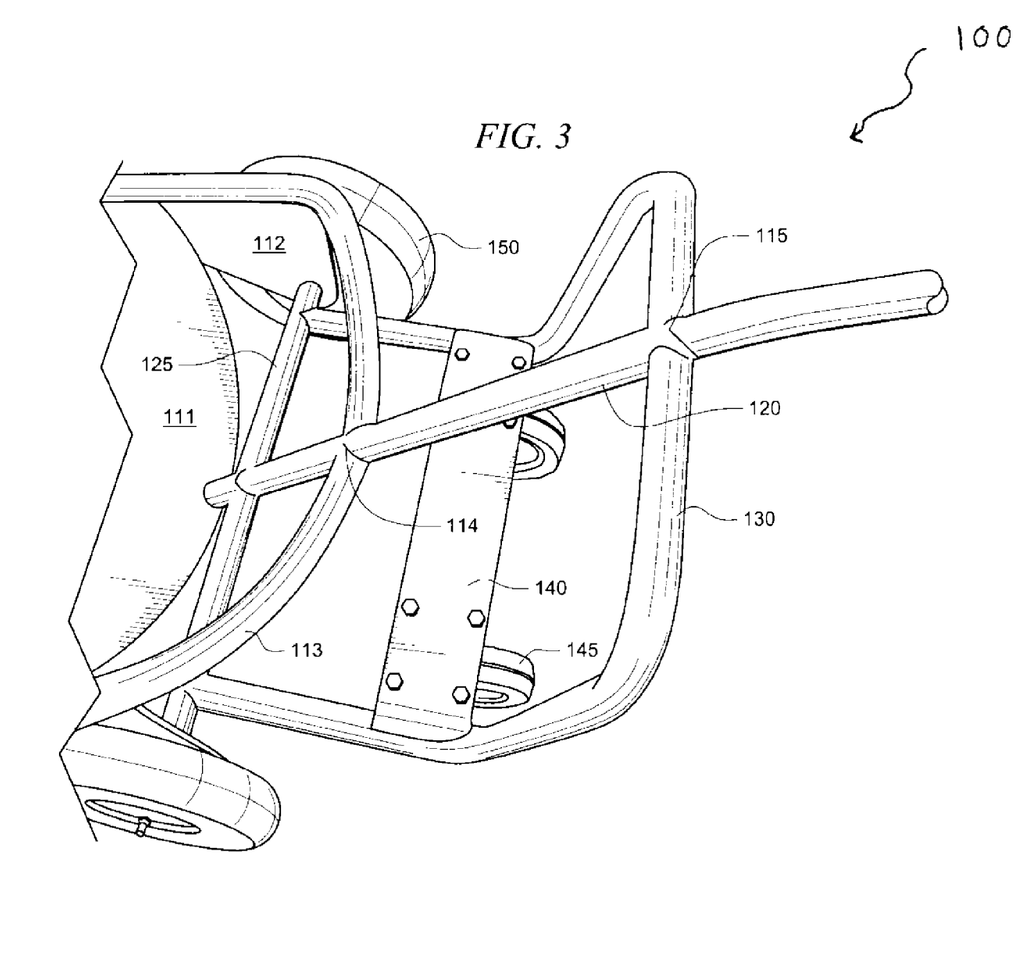
FIG. 3 illustrates a close up view of another portion of an embodiment of the present invention.
Figure 4:
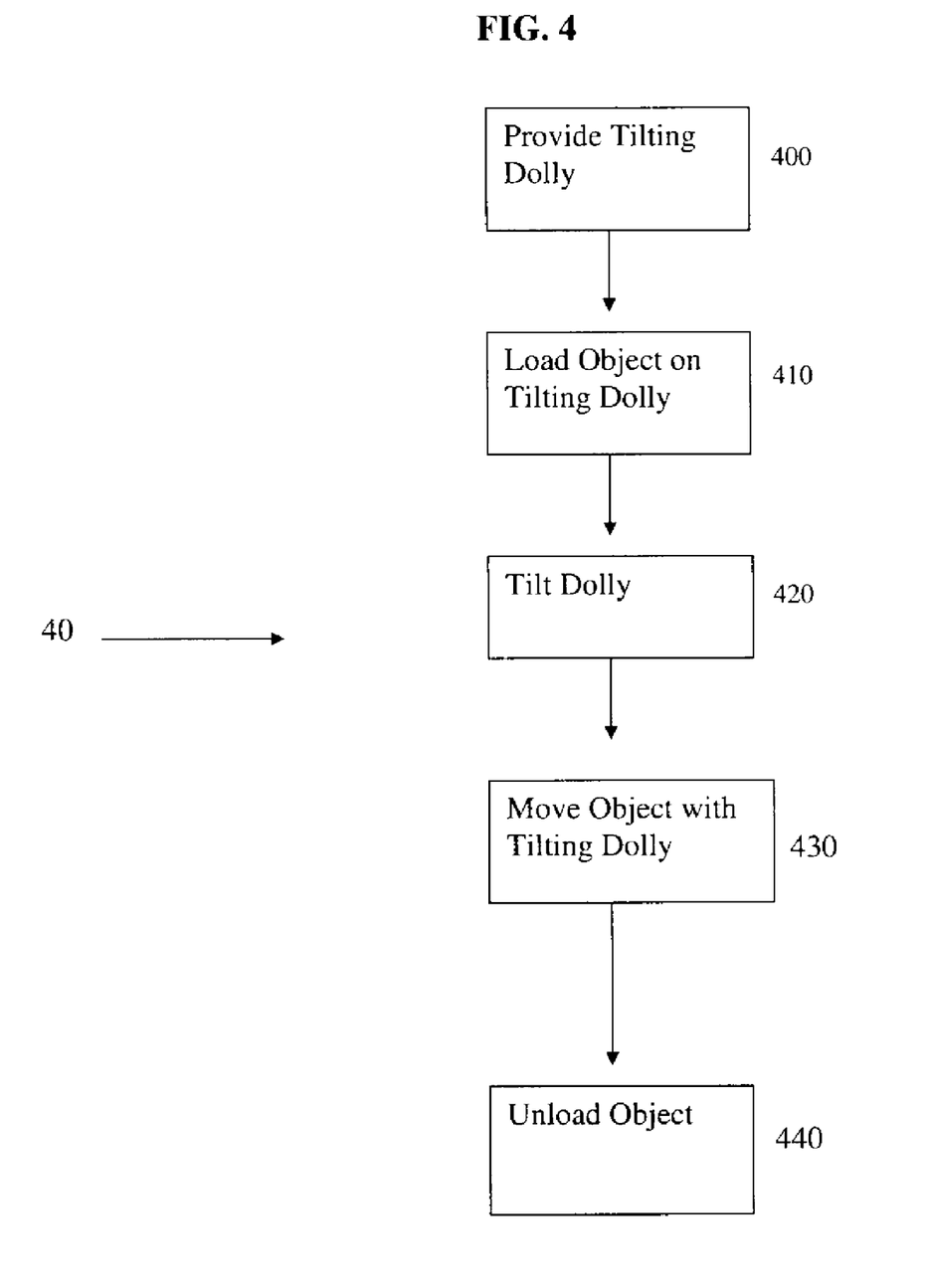
FIG. 4 illustrates a flowchart representing one method for moving objects according to one embodiment of the present invention.

A preferred embodiment of a tilting dolly adapted according to the present invention is shown generally as tilting dolly 100 in FIGS. 1, 2 and 3. FIG. 1 illustrates a side overview of an embodiment of the present invention; FIG. 2 illustrates close up view of a portion of an embodiment of the present invention with a potted plant located on the embodiment in a "sitting-back" position; FIG. 3 illustrates a close up view of another portion of an embodiment of the present invention; and FIG. 4 illustrates a flowchart representing one method for moving objects according to one embodiment of the present invention. Tilting dolly 100 includes base member 110, frame member 120, wheel support frame member 125, frame member 130, stabilizer bar 140, support wheels 145, and side wheels 150. Base member 110, frame member 120, wheel support frame member 125, frame member 130, and stabilizer bar 140 may be made of any number of various materials, such as metal, plastic, chrome, iron, stainless steel, aluminum, wood, any combination thereof, and the like.

As illustrated in FIG. 1, frame member 120 may include handle 121. Handle 121 assists a user in operating the present invention. It provides a location in which a user may grip the present invention with his/her hands so that the user may then have control over moving and/or operating the present invention. While handle 121 is illustrated in FIG. 1 as a circular-oblong shaped handle, the present invention is not limited to this configuration as handle 121 may take any number of shapes and configurations, such as square shaped, loop shaped, rectangular shaped, and the like.

As illustrated in FIGS. 1, 2, and 3, frame member 120 extends down from handle 121 towards frame member 130. Frame member 120 provides a mounting location for frame member 130. Frame member 120 extends down past frame member 130 to wheel support frame member 125 and continues to extend down to flat member 111 of base member 110 as illustrated in FIGS. 1, 2, and 3.

In one embodiment, as illustrated in FIGS. 1, 2, and 3, base member 110 comprises flat member 111, side walls 112, and curved frame member 113. Base member 110, as illustrated in FIGS. 1 and 2, may be circular and/or round shaped to accommodate objects that are odd shaped and/or large, such as circular objects, trapezoidal objects, large oblong objects, drums, plants, large potted plants, large plant pots, circular pots, and the like. However, the present invention is not limited to this configuration as base member 110 may take the form of any number of shapes.

In one embodiment, frame member 120 may extend down past frame member 130 and mount to flat member 111 of base member 110 as illustrated in FIG. 3. Wheel support frame member 125 provides a mounting location for side wheels 150 and side walls 112, as illustrated in FIG. 3. In one embodiment, as illustrated in FIG. 3, the outer edges of the back of side walls 112 of base member 110 mount to wheel support frame member 125. Side walls 112 of base member 110 may connect to wheel support frame member 125 through any number of connection mechanisms, such as a permanent welded connection, a screw, a bolt, a cotter pin, and the like. Wheel support frame member 125 maintains the position of side wheels 150 relative to each other. In addition, wheel support frame member 125 bears a portion of the weight of the present invention and a portion of the weight of any object that may be moved on the present invention.

In one embodiment of the present invention, wheel support frame member 125 is a shaft on which side wheels 150 revolve thereby enabling side wheels 150 to move so that the present embodiment may move, via side wheels 150, when in use. The present embodiment may be configured so that wheel support frame member 125 functions as an axle that is configured in a fixed position in which a bearing or bushing may sit inside of a hole in side wheels 150 to allow side wheels 150 to rotate around wheel support frame member 125. In an alternative embodiment, wheel support frame member 125 may be configured with an internal rod that may be configured to connect to side wheels 150 to enable side wheels 150 to rotate while wheel support frame member 125 is stationary.

In one embodiment, wheel support frame member 125 may provide a mounting location for frame member 130. As illustrated in FIG. 3, frame member 130 may extend out from frame member 120 and continue down to wheel support frame member 125 whereby frame member 130 may be mounted and/or attached to wheel support frame member 125. However, the present embodiment is not limited to this configuration as the present embodiment may be configured in any of number of ways so that side wheels 150 may rotate thereby enabling the present invention to easily move. In an embodiment in which wheel support frame member 125 rotates as side wheels 150 move, the present embodiment may be configured so that a hole is cut in frame member 120 wherein wheel support frame member 125 slides into said hole and may rotate and/or move as side wheels 150 move. In an embodiment in which wheel support frame member 125 does not move as side wheels 150 move, wheel support frame member 125 may be connected to and/or attached to frame member 120 by any number of connections, such as a permanent welded connection, a bolt, screw, cotter pin, and the like. For example, FIG. 3 illustrates wheel support frame member 125 in a configuration in which wheel support frame member 125 does not move as wheels 150 move and is permanently welded to frame member 120.

As described above, frame member 120 may extend down past frame member 130 to wheel support frame member 125 and continue to extend past wheel support frame member 125 to base member 110. Frame member 120 may stop at base member 110 and may provide a mounting location for base member 110 whereby flat member 111 of base member 110 may connect, mount, and/or attach to frame member 120.

Base member 110 is preferably configured so that flat member 111, side walls 112, and curved frame member 113 are all connected to one another. For example, as illustrated in the embodiments shown in FIGS. 1, 2 and 3, side walls 112 of base member 110 may be configured so that side walls 112 may connect to flat member 111 of base member 110 and extend upward and connect to curved frame member 113 of base member 110, and extend backward and connect to wheel support frame member 125 as illustrated in FIG. 3. However, the present invention is not limited to this configuration, as side walls 112 may be configured to not extend and not connect to wheel support frame member 125. In one embodiment, side walls 112 may be sized to extend back toward frame member 120 and connect to frame member 120. As illustrated by the embodiments of FIGS. 1 and 2, side walls 112 and frame member 120 may be configured and positioned so that tilting dolly 100 provides an open-back area around frame member 120 to prevent restriction of objects to be moved and to prevent any possible damaging of objects moved with tilting dolly 100.

A configuration of the present invention to provide for an open-back area around frame member 120 is advantageous as it prevents unwanted damage to objects that may be moved with tilting dolly 100. For example, when moving a large potted plant with tilting dolly 100, side walls 112 and curved frame member 113 will preferably only extend up to a certain distance, such as the top of a flower pot/planter of a potted plant to be moved, so that the plant will not be damaged by side walls 112 of base member 110 and/or curved frame member 113 of base member 110. Any types of plants, trees, vegetation and the like may be moved with the present invention, and plants, trees, and/or vegetation comprise several branches, leaves and/or flowers that are often damaged when forced up against objects and/or barriers, such as side walls 112. Yet, when the branches of plants, trees, and/or vegetation are not obstructed, do not sit up against, and do not rub against barriers, such as side walls 112, these portions of the plants, such as branches, leaves and/or flowers and like, will not be damaged. In one embodiment, with side walls 112 not extending all the way up along frame member 120, the open-back area around frame member 120 will prevent damage to plants, trees, and/or vegetation being moved with the present invention because when plants and/or vegetation are transported with tilting dolly 100, the plants are not forced up against, obstructed by, and/or bent or disfigured by any barriers, such as side walls 112.

Although FIGS. 1 and 2 illustrate side walls 112 and curved frame member 113 configured to only extend up a small distance, such that there is an open-back area around frame member 120, the present invention is not limited to such configuration. Base member 110 may be configured so that side walls 112 and curved frame member 113 may be configured in any number of sizes to accommodate any number of objects. For example, in one embodiment, side walls 112 and curved frame member 113 may be configured so that they are adjustable and can expand and collapse depending on the object that is being moved with the present invention. In such an embodiment, side walls 112 and curved frame member 113 may extend upward along frame member 120 as needed. For example, if the present invention is being used to move large cylindrical bottles and/or tanks, then side walls 112 and curved frame member 113 may extend upward along frame member 120 so that side walls 112 may extend all the way up to the top of the cylindrical bottles and/or tanks being moved. The present invention may also be configured so that the portion of side walls 112 and curved frame member 113 that extends upward along frame member 120 are made of one material, while the base portion of side walls 112 and curved frame member 113 are made of a second material.

In an embodiment, flat member 111 of base member 110 is a planar sheet member, made of any number of materials, such as metal, plastic, steel, stainless steel, wood, chrome, aluminum, iron, and the like. Flat member 111 of base member 110 functions as a bottom plate and holding member in which objects to be moved by the present invention are placed upon and sit on flat member 111 so that an object placed on flat member 111 will sit on flat member 111 and may then be moved with the present invention. Flat member 111 may take the form of any number of shapes, such as circular, triangular, trapezoidal, rectangular, square shaped, and the like. In one embodiment, flat member 111 may be configured with a plurality of holes to provide for drainage of any number of substances, such as dirt, water, rocks, gravel, sand and the like. For example, if the present embodiment is in use moving a large potted plant whereby sand, dirt, and/or other debris spills out of the potted plant onto flat member 111, a plurality of holes in flat member 111 may provide for drainage of the debris away from tilting dolly 100.

In one embodiment, flat member 111 may be configured so that a plurality of wheels, rollers, and/or spherical balls are mounted to and/or in flat member 111 whereby the plurality of wheels, rollers, and/or spherical balls assist in moving objects onto flat member 111. For example, the plurality of wheels, rollers, and/or spherical balls may be sized and placed in a section of flat member 111 so that as an object is being loaded on flat member 111, any portion of the object can be placed on any portion of the plurality of wheels, rollers, and/or spherical balls in flat member 111 so that the object may be pushed and rolled onto flat member 111 by being pushed on and/or over any of the plurality of wheels, rollers, and/or spherical balls in flat member 111 thereby reducing the amount of energy and force needed to load an object onto flat member 111. In a preferred embodiment, any wheels and/or rollers in flat member 111 may be configured so that the wheels and/or rollers will also help to unload any objects that have been placed upon flat member 111. In another embodiment, the rollers and/or wheels of flat member 111 may be configured so that when the present invention is being used to move an object, the wheels and/or rollers in flat member 111 may lock up and prevent objects from moving on flat member 111 while the present invention is in use thereby preventing the possibility of any objects rolling and/or moving off of flat member 111 due to any rollers and/or wheels that may be located and/or configured in flat member 111, while tilting dolly 100 is being moved.

Flat member 111 may be configured in any number of sizes. For example, the present invention may be configured to accommodate movement of smaller objects, and in such a configuration, flat member 111 may be sized accordingly to accommodate movement of smaller objects. In other embodiments of the present invention, flat member 111 may be large to accommodate movement of large objects. In an embodiment where flat member 111 is wide, the remaining components of the present invention may also be sized accordingly to line up with the size of flat member 111. However, the present embodiment is not limited to this configuration. For example, wheel support frame member 125 may be longer in embodiments that have a wide flat member 111 as the width of flat member 111 may be constrained by the length of wheel support frame member 125. In embodiments with a narrow flat member 111, wheel support frame member 125 may be shorter to account for the narrowness of flat member 111. In other embodiments, the present invention may be configured so that the size of flat member 111 is adjustable. For example, the present invention may be configured so that flat member 111 may expand into a larger flat member 111 or collapse into a smaller flat member 111 to account for the size of the object to be moved with the present invention. The adjustability discussed above is not limited to flat member 111, as the present invention may be configured so that any of the members comprising tilting dolly 100 are adjustable and may be adjusted to account for the size and layout of the object to be moved on tilting dolly 100. For example, if a large wide object is to be moved with tilting dolly 100, then flat member 111, wheel support frame member 125, curved frame member 113, frame member 130, and stabilizer bar 140 may all be adjusted and/or resized to account for the size of the large wide object to be moved with tilting dolly 100.

In an embodiment of the present invention, side walls 112 are planar members, which may comprise any number of materials, such as metal, plastic, steel, stainless steel, wood, chrome, aluminum, iron, and the like. Side walls 112 may be connected between curved frame member 113 and flat member 111. In one embodiment, side walls 112 may be configured so that one side of side walls 112 connects to curved frame member 113 at the top of side walls 112, an opposite side of side walls 112 connects to flat member 111 and a back side of side walls 112 may connect to frame member 120 or may connect to wheel support frame member 125, as illustrated in FIG. 3. However, the present invention is not limited to this configuration as, side walls 112 may be configured to connect to the various members of the present embodiment in any number of configurations so that side walls 112 are stabilized and can act as a barrier and assist in preventing objects from falling off of the present invention. In one embodiment, the present invention may be configured so that side walls 112 are removable and can slide in and out of base member 110. For example, the present invention may be configured so that side walls of various sizes and shapes can be interchanged to account for the size of an object that is being transported on the present invention. When a small object is being transported on the present invention, side walls 112 may be small and when a large object is being transported, side walls 112 may be large. Side walls 112 may also be interchangeable for various other reasons. For example if a wet object were being moved with the present invention, waterproof side walls 112 may be installed so that the wet object will not affect side walls 112, and if a delicate object, such as an antique vase were being moved with the present invention, then soft padded sidewalls 112 may be installed so that the delicate object will not be scratched or damaged by a non-padded set of side walls 112. In another embodiment, the present invention may be configured so that side walls 112 may be expandable and/or adjustable so that depending on the object to be moved with the present invention, side walls 112 may be extended to provide some support and/or side support for the object being moved on tilting dolly 100.

Curved frame member 113 of base member 110 attaches and/or connects to frame member 120 at connection point 114 as illustrated in FIGS. 1, 2, and 3. Curved frame member 113 may connect and/or attach to frame member 120 by any number of ways, such as a permanent welded connection, a bolt, screw, cotter pin, and the like. As illustrated in FIGS. 1 and 2, curved frame member 113 of base member 110 extends from connection point 114 out on both the right and left sides of frame member 120 so that curved frame member 113 extends out in a circular shape. Although only one side is illustrated in FIGS. 1 and 2, curved frame member 113 extends out and down on both the left and right sides. Curved frame member 113 extends out and eventually curves downward toward flat member 111. Curved frame member 113 of base member 110 may stop at flat member 111 or it may curve under back toward frame member 120 at flat member 111 forming a bottom curved frame member 113b that may extend all the way back toward frame member 120 as illustrated in FIG. 2. However, the present invention is not limited to this configuration, as curved frame member 113 of base member 110 may simply stop at flat member 111 so that there is no bottom curved frame member 113b.

As illustrated in the embodiments of FIGS. 1 and 2, the present invention may be configured so that frame member 130 mounts to frame member 120 at connection point 115. From connection point 115, frame member 130 preferably extends outward from frame member 120 to both the right and left sides of frame member 120 and is configured to extend down to stabilizer bar 140 and curve at stabilizer bar 140 and extend to and connects to wheel support frame member 125, as illustrated in FIG. 3. However, the present invention is not limited to this configuration, as frame member 130 may not connect to wheel support frame member 125 as frame member 130 may be configured in alternative embodiments to extend either over or under wheel support frame member 125 and connect to flat member 111 of base member 110.

Frame member 130 is advantageous because it is configured to assist in distributing the weight from tilting dolly 100 and any object loaded on flat member 111 so that the weight is distributed between wheels 145 and 150. Frame member 130 is also configured to provide a sufficient mounting location and framework for stabilizer bar 140. Stabilizer bar 140, as illustrated in FIGS. 1, 2, and 3 may be mounted to frame member 130. Stabilizer bar 140 may be mounted to frame member 130 by any means of connection, such as permanent welded connection, a bolt, screw, cotter pin, and the like. Frame member 130 in connection with stabilizer bar 140 and wheels 145 assist in improving and adding stability to the present invention. For example, when an object is placed upon flat member 111 and the present invention is then pushed and/or leaned back to a tilted position, so that the present invention with an object resting on flat member 111 can be moved, frame member 130 provides stability so that the present invention will not tilt over and/or fall while the present invention is in motion.

Stabilizer bar 140 is also configured to provide a mounting location for wheels 145. Wheels 145 mount to stabilizer bar 140 and help maintain the stability of the present invention when in use. When tilting dolly 100 is a forward position, flat member 111 rests upon the ground and/or surface and the combination of wheels 150 and flat member 111 resting on the ground and/or surface help maintain the stability of tilting dolly 100 in the forward position. Wheels 145 are advantageous to the present invention because wheels 145 enable tilting dolly 100 to easily move and assists in keeping tilting dolly 100 stable when tilting dolly 100 is in a tilted back position. In a tilted back position, the weight of tilting dolly 100 and of any object located on flat member 111 will rest between wheels 145 and 150.

Wheels 145 may mount to stabilizer bar 140 by any number of ways, such as a screw, bolt, cotter pin, and the like. In addition, wheels 145 may be any size and may comprise any number of types of wheels, such as rubber wheels, plastic wheels, caster wheels and the like. The present invention may also be configured so that wheels 145 may be quickly changed depending on the size of the object being moved and/or depending on where the present invention is being used. For example, if the present invention were being used to move objects through dirt, gravel and the like, wheels 145 may be large wheels that can easily operate through such terrain. The present invention may also be configured to include brakes that prevent wheels 145 from moving. In addition, wheels 145 are preferably configured so that wheels 145 can rotate and/or pivot 360 degrees, so that turning the present invention is user friendly and maneuvering tilting dolly 100 in restricted areas of limited space can easily be accomplished. However, the present invention is not limited to this configuration.

In another embodiment of the present invention, a foot pedal may be installed to the present invention, such as installed to frame member 130, to stabilizer bar 140, or some other location whereby the foot pedal may enable a user to apply force to the foot pedal to assist in leaning tilted dolly 100 back in the tilted position. For example, when a large object is sitting on flat member 111, a user can apply force to the foot pedal, to assist in tilting the present invention back so that it rests on wheels 145 and 150, as opposed to trying to pull and/or push the present invention to its backwards/tilted position. In an alternative embodiment, stabilizer bar 140 may be utilized as a foot pedal. In such an embodiment, stabilizer bar 140 may be altered so that it is sized to accommodate force applied by a user's foot.

In using stabilizer bar 140 instead of and/or in addition to a foot pedal, a user may apply force to stabilizer bar 140 by pressing down on stabilizer bar 140 and using stabilizer bar 140 as a leverage point to assist in tilting the present invention in a backward direction. For example, if tilting dolly 100 is used to transport a large potted plant and/or cylindrical object, a user may first position the large potted plant and/or cylindrical object on flat member 111. After the object is located on flat member 111, a user may then move tilting dolly 100 in a tilted position so that tilting dolly 100 will rest on wheels 150 and 145. In order to position the tilting dolly 100 in a tilted position, a user may use his/her foot to apply force to stabilizer bar 140 to move tilting dolly 100 in a tilted position so that tilting dolly 100 sits back and rests on wheels 150 and 145. Once tilting dolly 100 is sitting back on wheels 150 and 145, a user can then easily move tilting dolly 100 and any objects on tilting dolly 100.

FIG. 4 illustrates a flowchart representing one method for moving objects according to one embodiment of the present invention. Flow 40 represents a method for moving objects. A tilting dolly is provided in block 400. The tilting dolly may comprise tilting dolly 100 illustrated in FIGS. 1 and 2. After the tilting dolly is provided, flow 40 proceeds to block 410, where an object is loaded on the tilting dolly. For example, the object may be a large potted plant, large cylindrical object, a trash can, a 5-gallon bottle/jug of water and the like.

In loading an object on the tilting dolly, such as tilting dolly 100 of FIGS. 1 and 2, a user preferably moves tilting dolly 100 close to and/or next to the object to be moved so that the edge of flat member 111 of tilting dolly 100 is positioned next to and/or near the object to be moved. With flat member 111 positioned near the object to be moved, a user may then slide the object onto flat member 111 without performing any heavy lifting of the object to the be moved. For example, if a large potted plant is being moved, then a user may move the tilting dolly 100 next to the potted plant so that flat member 111 is next to and/or touching the potted plant. A user may then slide the potted plant onto flat member 111 without having to perform any heavy lifting of the entire potted plant off of the surface.

After the object is loaded onto flat member 111, flow 40 proceeds to block 420. In block 420, the tilting dolly and the object to be moved, located on the tilting dolly, is then moved to a tilted position. For example, to move the tilting dolly, such as tilting dolly 100, to a tilted position, a user can apply leverage and/or force to one or more of stabilizer bar 140, any foot pedals, and/or handle 121 of tilting dolly 100 to assist in moving tilting dolly 100 to a tilted position so that the tilting dolly and any object loaded on the tilting dolly rests on wheels 150 and 145. Once the tilting dolly with the object loaded upon it is positioned in a tilted back position, a user is ready to move the object via the tilting dolly.

After block 420, flow 40 proceeds to block 430. When flow 40 proceeds to block 430, the tilting dolly and the object to be moved may be moved to its final location where it may then be moved off of the tilting dolly. For example, after the object, such as a large potted plant has been loaded on the tilting dolly, and the tilting dolly has been moved to a tilted position so that some of the weight of the tilting dolly and object is distributed on and/or between wheels 150 and 145, a user can use the tilting dolly to move the potted plant to the desired location. After block 430, flow 40 proceeds to block 440. When flow 40 proceeds to block 440, the object is unloaded. In unloading an object from the tilting dolly, such as tilting dolly 100, the tilting dolly is moved to a non-tilted/upright position so that wheels 145 are not touching the ground/surface. After titling dolly 100 is in an upright position, a user may then slide the potted plant/object off of flat member 111 without having to perform any heavy lifting of the plant and/or object. Thus, the present invention may be used to move objects without requiring any heavy lifting of the objects to be moved.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for moving objects comprising:
   a first frame member;
   a second frame member connected to said first frame member;
   a wheel support frame member;
   a base member connected to said first frame member wherein said base member comprises:
     a flat member for holding objects to be moved;
     a curved frame member wherein said curved frame member extends outward and away from said first frame member on both the right and left sides of said first frame member at a connection point so that said curved frame member extends out to an end point and forms a semi-circular shape wherein said curved frame member will extend downward at said end point until said curved frame member reaches said flat member; and
     one or more side panels with a plurality of sides wherein said side panels are planar in shape and wherein:
       a first side panel extends upward from a right side of said flat member to said curved frame member wherein two sides of said first side panel connect to said curved frame member and a third side of said first side panel connects to said flat member and a fourth side of said first side panel connects to said wheel support frame member;
       a second side panel extends upward from a left side of said flat member to said curved frame member wherein two sides of said second side panel connect to said curved frame member and a third side of said second side panel connects to said flat member and a fourth side of said second side panel connects to said wheel support frame member so that connection of said first and second side panels forms a semicircular enclosure;
   a stabilizer bar; and
   a plurality of wheels.

2. The system of claim 1 wherein said plurality of wheels comprises:
   two or more wheels mounted to said stabilizer bar; and
   two or more wheels mounted to said wheel support frame member.

3. The system of claim 2 wherein said base member is sized so that an open area is created around said first frame member wherein said open area prevents restriction of objects to be moved with said system.

4. The system of claim 3 further comprising:
   a foot pedal that is configured to receive a downward force and further configured so that when said foot pedal receives a downward force, said foot pedal will position said system for moving objects in a sitting back position so that said system will rest on said plurality of wheels so that any object placed on said flat member will be elevated above a ground surface.

5. The system of claim 2 wherein said size of said flat member is adjustable.

6. The system of claim 2 wherein said size of said side panels are adjustable.

7. The system of claim 2 wherein:
said size of said first frame member, said second frame member, and said wheel support frame member are adjustable.

8. The system of claim 2 wherein said first frame member, said second frame member, said base member, said wheel support frame member, said stabilizer bar, and said plurality of wheels are configured so that when said system is placed in a sitting back position, said system will remain in a sitting back position resting on said plurality of wheels.

9. The system of claim 2 wherein:
said two or more wheels mounted to said stabilizer bar are smaller than said two or more wheels mounted to said wheel support frame member.

10. The system of claim 9 wherein:
said wheel support frame member is configured as an axle with said two or more wheels mounted to said wheel support frame member mounted to the ends of said wheel support frame member so that when said wheel support frame member moves, said two or more wheels mounted to said wheel support frame member will also move.

11. The system of claim 10 wherein said two or more wheels mounted to said stabilizer bar are caster wheels that can rotate.

12. A system for moving plants comprising:
a first frame member comprising a handle;
a second frame member connected to said first frame member;
a wheel support frame member connected to said first frame member, said second frame member, and said base member;
a base member connected to said first frame member wherein said base member comprises:
 a flat member for holding objects;
 a curved frame member wherein said curved frame member extends outward and away from said first frame member on both the right and left sides of said first frame member at a connection point so that said curved frame member extends out to an end point and forms a semi-circular shape wherein said curved frame member will extend downward at said end point until said curved frame member reaches said flat member; and
 one or more side panels with a plurality of sides wherein said side panels are planar in shape and wherein:
  a first side panel extends upward from a right side of said flat member to said curved frame member wherein two sides of said first side panel connect to said curved frame member and a third side of said first side panel connects to said flat member and a fourth side of said first side panel connects to said wheel support frame member;
  a second side panel extends upward from a left side of said flat member to said curved frame member wherein two sides of said second side panel connect to said curved frame member and a third side of said second side panel connects to said flat member and a fourth side of said second side panel connects to said wheel support frame member so that connection of said first and second side panels forms a semicircular enclosure;
one or more wheels connected to said wheel support frame member;
a stabilizer bar connected to said second frame member; and
one or more wheels connected to said stabilizer bar.

13. The system of claim 12 wherein said curved frame member is configured to provide support for plants resting on said flat member.

14. A method for moving objects comprising:
providing a system for moving objects wherein said system comprises:
 a first frame member;
 a second frame member connected to said first frame member;
 a wheel support frame member;
 a base member connected to said first frame member wherein said base member comprises:
  a flat member for holding objects to be moved;
  a curved frame member wherein said curved frame member extends outward and away from said first frame member on both the right and left sides of said first frame member at a connection point so that said curved frame member extends out to an end point and forms a semi-circular shape wherein said curved frame member will extend downward at said end point until said curved frame member reaches said flat member; and
  one or more side panels with a plurality of sides wherein said side panels are planar in shape and wherein:
   a first side panel extends upward from a right side of said flat member to said curved frame member wherein two sides of said first side panel connect to said curved frame member and a third side of said first side panel connects to said flat member and a fourth side of said first side panel connects to said wheel support frame member;
   a second side panel extends upward from a left side of said flat member to said curved frame member wherein two sides of said second side panel connect to said curved frame member and a third side of said second side panel connects to said flat member and a fourth side of said second side panel connects to said wheel support frame member so that connection of said first and second side panels forms a semicircular enclosure;
 a stabilizer bar; and
 a plurality of wheels;
positioning an object on said flat member of said base member;
applying force to said system to position said system in a sitting back position whereby said system will rest on said plurality of wheels; and
moving said system for moving objects.

15. The method of claim 14 wherein said plurality of wheels comprises:
two or more wheels connected to said wheel support frame member; and
two or more wheels connected to said stabilizer bar.

16. The method of claim 15 wherein said system for moving objects further comprises a foot pedal.

17. The method of claim 16 wherein said step of applying force to said system comprises:
applying a downward force to said foot pedal to position said system for moving objects in a sitting back position so that said system will rest on said plurality of wheels so that said object placed on said base member will be elevated above a ground surface.

* * * * *